United States Patent
Yukawa et al.

(10) Patent No.: US 7,303,292 B2
(45) Date of Patent: Dec. 4, 2007

(54) HUE VARIABLE RETROREFLECTIVE SHEET

(75) Inventors: Shigeo Yukawa, Wakayama (JP); Jiro Sukoboshi, Osaka (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 0 days.

(21) Appl. No.: 10/594,302

(22) PCT Filed: Apr. 22, 2005

(86) PCT No.: PCT/JP2005/007682

§ 371 (c)(1),
(2), (4) Date: Sep. 26, 2006

(87) PCT Pub. No.: WO2005/106541

PCT Pub. Date: Nov. 10, 2005

(65) Prior Publication Data

US 2007/0188866 A1    Aug. 16, 2007

(30) Foreign Application Priority Data

Apr. 28, 2004   (JP) .............................. 2004-134216

(51) Int. Cl.
*G02B 5/124*   (2006.01)
*G02B 5/128*   (2006.01)
*B32B 3/00*   (2006.01)
*B32B 18/00*   (2006.01)

(52) U.S. Cl. ...................... 359/530; 359/536; 359/538; 359/539; 359/541; 428/207; 428/209; 428/210; 428/325

(58) Field of Classification Search .................... None
See application file for complete search history.

(56) References Cited

U.S. PATENT DOCUMENTS

| 4,099,838 | A | * | 7/1978 | Cook et al. ................. 359/537 |
| 6,000,804 | A |   | 12/1999 | Kimura et al. |
| 2003/0138609 | A1 |   | 7/2003 | Wada et al. |
| 2004/0241400 | A1 |   | 12/2004 | Friedl et al. |
| 2006/0057323 | A1 | * | 3/2006 | Yukawa et al. ............ 428/40.1 |

FOREIGN PATENT DOCUMENTS

EP    0905530    3/1999

(Continued)

*Primary Examiner*—James Phan
(74) *Attorney, Agent, or Firm*—Hamre, Schumann, Mueller & Larson, P.C.

(57) ABSTRACT

The hue variable retroreflective sheet of the present invention includes: a surface layer (1) composed of at least one layer; and a plurality of retroreflective elements (3, 4, 5) that are positioned beneath the surface layer, wherein the retroreflective elements (3, 4, 5) retroreflect incident light toward a light source direction, at least one layer of the surface layer (1) is an optical coherent layer that changes in color depending on a point of view, and in which an optical coherent coloring material with a core material having a surface that is covered with one or more substantially transparent coating layer is dispersed, and mirror-reflects the incident light toward a direction opposite to the light source side, at least one layer of the retroreflective sheet is a colored layer containing a coloring material that colors retroreflected light, and the retroreflected light and the mirror-reflected light provide different hues. Thereby, the present invention provides the hue variable retroreflective sheet that provides hues in two or more different colors by the interference of light in daylight, provides retroreflected light in color with a hue that is different from the hue in the daylight when light is projected at night, and provides a color that has still different from the hue of the retroreflected light on the other side of an incident light beam.

18 Claims, 5 Drawing Sheets

FOREIGN PATENT DOCUMENTS

| | | |
|---|---|---|
| JP | 5-45507 | 2/1993 |
| JP | 6-155693 | 6/1994 |
| JP | 7-128507 | 5/1995 |
| JP | 11-167010 | 6/1999 |
| JP | 2002-019259 | 1/2002 |
| JP | 2003-29012 | 1/2003 |
| WO | 03/035409 | 1/2003 |
| WO | 03/087896 | 10/2003 |

\* cited by examiner

HUE VARIABLE RETROREFLECTIVE SHEET

TECHNICAL FIELD

The present invention relates to a hue variable retroreflective sheet, which can be used for vehicle license plates, security sheets, advertising signs, wrapping sheets for vehicles, toys, decorated cases, mobile phones and the like.

BACKGROUND ART

Retroreflective sheets have found use in a wide range of applications, such as traffic signs, guide signs, warning signs, restriction signs, vehicle license plates, advertising signs, and so forth. An example of the retroreflective sheet is called an enclosed lens type including: a surface layer composed of at least one layer; a high-refractive-index glass bead; a focusing layer (also called a focusing resin layer); and a metal reflective layer, which are laminated in this order. Another configuration is what is called an encapsulated lens type including: a plurality of transparent spheres provided with a reflective mirror on its lower hemisphere; a resin support sheet for supporting the plurality of transparent spheres; and a transparent cover film that covers the plurality of transparent spheres by being disposed on the surface of the resin support sheet. A connection part for holding the cover film is formed on the resin support sheet. In the case of the encapsulated lens type, since the reflective mirror is formed directly on the surface of the transparent sphere, a reflective brightness at a small observation angle and up to a large incident angle is remarkably superior to that of the enclosed lens type, and thus the encapsulated lens type also is called a high-brightness retroreflective sheet. In the above-mentioned retroreflective sheet, a pressure-sensitive adhesive and a release paper or a release film further are laminated. Such a retroreflective sheet is attached onto a substrate, for example, a metal substrate, such as an aluminum plate, an iron plate, a coated iron plate and a stainless steel plate, or a plastic plate of fiber reinforced plastic (FRP), hard vinyl chloride or the like, and is used as a sign, a signboard or the like. In the daylight, such a retroreflective sheet is observed visually similarly to a typical sign or a typical signboard, but at night, the retroreflective sheet retroreflects the projected light regularly toward the light source direction, and thus has been useful for remarkably enhancing the visibility of the above-mentioned signs, vehicle license plates, signboards and the like. However, a hue of the conventional retroreflective sheet in daylight is substantially equal to a hue of light that is retroreflected toward the light source direction when the light is projected onto the conventional retroreflective sheet at night. Also, the worldwide standard of a retroreflective sheet requires that the hue in daylight is substantially equal to the hue of the retroreflected light when light is projected onto the retroreflective sheet at night.

Therefore, there has been a serious problem in that such a retroreflective sheet, which can create only monochromic colors whose hues do not differ between in daytime and at night even when being decorated or used for signboards, cannot satisfy the needs for variations and peculiarities of designs of the recent various products.

A retroreflective sheet in which such difficulty in the designability is solved and the decorativeness is added is suggested by the below-described Patent document 1. This retroreflective sheet is a laminate including: a layer of a combination of a transparent surface film and a glass sphere fixing layer; a glass sphere; a thin focusing layer; a metal reflective layer; a pressure-sensitive adhesive layer; and a release paper, in this order from the surface side. A rear surface of the layer of this combination of the surface film and the glass sphere fixing layer holds the glass sphere so that about a half of the glass sphere is embedded therein. And, a lower hemisphere of this glass sphere is covered with the thin focusing layer, and a metal reflective layer is evaporated on its rear surface and reflects a light beam, which is incident into the glass sphere from the surface side of the sheet, that is an upside thereof, toward the surface side of the sheet again. In this sheet, a scattering phenomenon of the light occurs when the light beam is incident into the glass sphere and is emitted therefrom, thereby obtaining a reflected light in rainbow colors. This retroreflective sheet has a problem in that it is not provided with an original reflective performance for obtaining such a reflected light in rainbow colors, but it actually is a sheet with high decorativeness. Such a sheet is called a rainbow film by those of ordinary skill in the art.

Also, a coating layer structure and a retroreflective material that are provided with retroreflective performance and decorativeness by using a retroreflective material and an optical interference material are suggested. The below-described Patent document 2 suggests a coating layer structure provided with a colored reflective layer that is formed on a predetermined substrate, the retroreflective material that is provided on a surface layer side of the colored reflective layer and a clear layer that is provided on a surface layer side of the retroreflective material, wherein glittering materials having transparency and regular reflectivity are arranged to be dispersed in the clear layer. Moreover, the below-described Patent document 3 suggests a coating layer structure provided with a light reflective layer that is formed on a predetermined substrate and a clear layer having a retroreflective material that is disposed on an upper layer side of the light reflective layer, wherein an optical interference material that is positioned on an upper layer side of the retroreflective material and has optical transparency and regular reflectivity is disposed in the clear layer. Furthermore, the below-described Patent document 4 suggests a colored light retroreflective material including a reflective substrate and transparent microspheres arranged to be arrayed on the substrate, wherein an interference material layer that provides an interference color is provided on the reflective substrate, which retroreflects colored light in a color different from the incident light toward an incident light entering direction.

Patent document 1: JP 5(1993)-45507 A
Patent document 2: JP 6(1994)-155693 A
Patent document 3: JP 7(1995)-128507 A
Patent document 4: JP 11(1999)-167010 A However, regarding the rainbow sheet having the structure of Patent document 1, the color of the metal appears due to the presence of the metal reflective layer, and thus the color of the film becomes gray and lacks vividness. Moreover, rainbow colors that appear in daylight lack sharpness in hue, and do not provide attractiveness for the design using the rainbow sheet. Furthermore, when being used for wrapping vehicles and the like, the rainbow sheet has no retroreflective performance with respect to the irradiation of light by headlights of vehicles at night, and thus has a problem of lacking the designability and the visibility of the display that are the original purposes of the wrapping of the vehicles.

In addition, there is a problem in that, upon removing the metal reflective layer for avoiding the above-described influence of the metal, the reflectivity of light cannot be maintained and the rainbow colors disappear. Moreover, in the case of forming an information layer beneath the rainbow film so as to utilize it as a counterfeit preventing film, for applying the rainbow film to the counterfeit preventing film, the metal reflective layer reflects light substantially perfectly, and thus the displaying of the information layer positioned beneath the metal reflective layer cannot be observed visually. On the other hand, in the case of forming the information layer above the metal reflective layer so as to utilize it as the counterfeit preventing film, light passes through the above-described information layer before passing through the surface film and the glass spheres and emitting, and thus there is an inevitable problem in that the presence of the information layer is observed visually in general diffused light. As a result, those of ordinary skill in the art presently lose hope for obtaining a sheet that adopts the retroreflective sheet structure, has high decorativeness, and provides sufficient function as the counterfeit preventing film, in spite of the strong demands in the market.

Moreover, since the optical interference materials of Patent documents 2 and 3 uses mica as core materials, each of them uses a material that performs regular reflection with respect to a part of the light with a certain wavelength, and allows residual light to pass through as transmission light. However, each of these optical interference materials has a glittering appearance, but has a problem in that reflected light from the core material is decreased and thus an interference light amount is decreased, whereby a hue change in the diffused light is not sufficient, and the hue change by the regularly reflected light is also insufficient even in the projection of light at night. Furthermore, since the interference material layer of the above-described Patent document 4 is provided beneath the transparent microspheres, the interference light mainly depends on the retroreflected light and colors only the retroreflected light that are passed through the transparent microspheres, and the colors cannot be observed visually in diffused light from various directions in dependence on a point of view. In particular, in the projection of light at night, the interference material layer usually colors only retroreflected light, and thus has a problem in that the hue change of multicolor cannot be sufficiently observed depending on the viewing direction.

DISCLOSURE OF INVENTION

In order to solve the above-described problem, the present invention provides a hue variable retroreflective sheet that provides hues in two or more different colors by the interference of light in daylight, provides retroreflected light in color with a hue that is different from the hue in the daylight when light is projected on the sheet at night, and provides a color that is still different from the hue of the retroreflected light on the other side of an incident light beam, and a hue variable retroreflective sheet for security that is difficult to be counterfeited.

The hue variable retroreflective sheet of the present invention includes: a surface layer composed of at least one layer; and a plurality of retroreflective elements that are positioned beneath the surface layer, wherein the retroreflective element retroreflects incident light toward a light source direction, at least one layer of the surface layer is an optical coherent layer that changes in color depending on a point of view and in which an optical coherent coloring material with a core material having a surface that is covered with one or more substantially transparent coating layer is dispersed, and mirror-reflects the incident light toward a direction opposite to the light source side, at least one layer of the retroreflective sheet is a colored layer containing a coloring material that colors retroreflected light, and the retroreflected light and the mirror-reflected light provide different hues.

DESCRIPTION OF THE INVENTION

Figure 1:
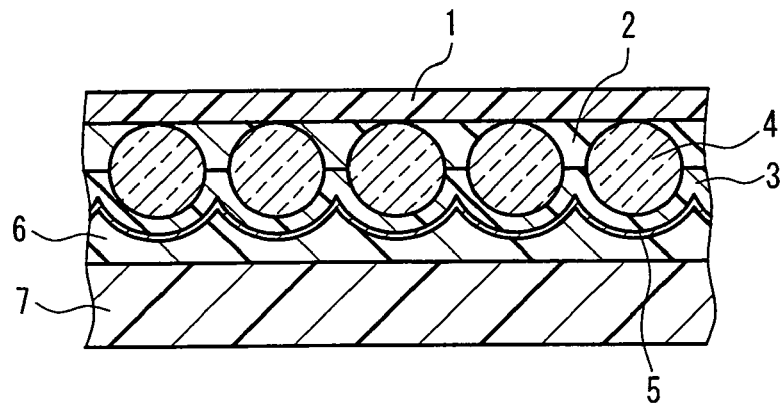
FIG. 1 is a cross-sectional view showing a hue variable retroreflective sheet that is applied to an enclosed lens type retroreflective sheet of Example 1 of the present invention.

The retroreflective sheet of the present invention is a sheet that provides hues in two or more different colors by the interference of light in daylight, and provides retroreflected light in color with a hue that is different from the hues in the daylight when light is projected on the sheet at night. Moreover, the retroreflective sheet of the present invention is designed to provide a color that is still different from that of the retroreflected light in a wider observation angle region on the other side of an incident light beam, thereby satisfying the needs for variations and peculiarities of designs. Furthermore, according to a preferred configuration where a position of the print resin layer and a position of the glass sphere are not overlapped, further improvement of counterfeit preventing effect can be achieved, besides the variations of colors.

According to the present invention, in the retroreflective sheet including a surface layer composed of at least one layer and a plurality of retroreflective elements that are positioned beneath the surface layer, a reflecting function that retroreflects incident light toward a light source direction and a reflecting function that mirror-reflect the incident light toward a direction opposite to the light source direction are provided, and the retroreflected light and the mirror-reflected light are colored in different colors. Moreover, the retroreflective sheet has an appropriate retroreflective performance, high designability with the counterfeit preventing effect, and a security function.

According to the present invention, in the retroreflective sheet including the surface layer composed of at least one layer and a plurality of retroreflective elements that are positioned beneath the surface layer, the retroreflective element has the function for retroreflecting the incident light toward the light source direction, at least one layer of the surface layer is an optical coherent layer that changes in color depending on the point of view and in which an optical coherent coloring material with a core material having a surface that is covered with one or more substantially transparent coating layer is added to be dispersed, and has a function of mirror-reflecting the incident light toward the direction opposite to the light source direction, at least one layer of the retroreflective sheet is a colored layer containing a coloring material that has a function for coloring the retroreflected light, and the retroreflected light and the mirror-reflected light provide different hues. Thereby, high designability can be achieved by the retroreflected light in the projection of light at night, and an effect by which the display can be visually recognized sufficiently not only on the projected side but also on the opposite side by the mirror-reflected light can be obtained.

The retroreflective sheet can be observed visually in diffused light, and provides hues in two or more colors depending on a point of view, thereby achieving excellent designability for daylight.

The optical coherent layer can be observed visually in the diffused light and has a function to provide hues in two or more different colors depending on a point of view, and the colored layer is positioned beneath the optical coherent layer. Thereby, at night, not only the retroreflected light, but also the mirror-reflected light in color that is different from that of the retroreflected light can generated also on the opposite side of the incident light, and thus the decorative effect at night can be remarkably improved due to the hue change depending on the point of view.

According to a configuration where a total visible light transmittance of the optical coherent layer is higher than a total visible light transmittance of the colored layer, the incident light at night can be transmitted with a high efficiency, and the retroreflected light can be reflected with a high efficiency.

Since the total visible light transmittance of the optical coherent layer is higher than the total visible light transmittance of the colored layer, and the total visible light transmittance of the optical coherent layer is 30% or more, the reflected light at night can be generated sharply.

The optical coherent coloring material is an optical coherent pigment including: a core material having a function that does not substantially transmit light and reflects the light; and a coating layer having a mirror-reflecting function on an interface between any of the layers. Thereby, an optical reflective efficiency can be improved, and thus the mirror-reflected light at night can be observed visually in a high observation angle region, thus being preferable.

The coloring material further is present, besides the optical coherent coloring material, in the optical coherent layer, and, where a content of the coloring material is a and a content of the optical coherent coloring material is β, α/β is 0.45 or less, then the coherence of the light in diffused light does not deteriorate, and the retroreflected light can be colored, thus being preferable.

Since at least one color of hues that can be observed visually in the diffused light and the hue of the retroreflected light is an achromatic color, when illumination light is projected onto the retroreflective sheet, the coloring becomes more vivid, thus being preferable.

Figure 12:
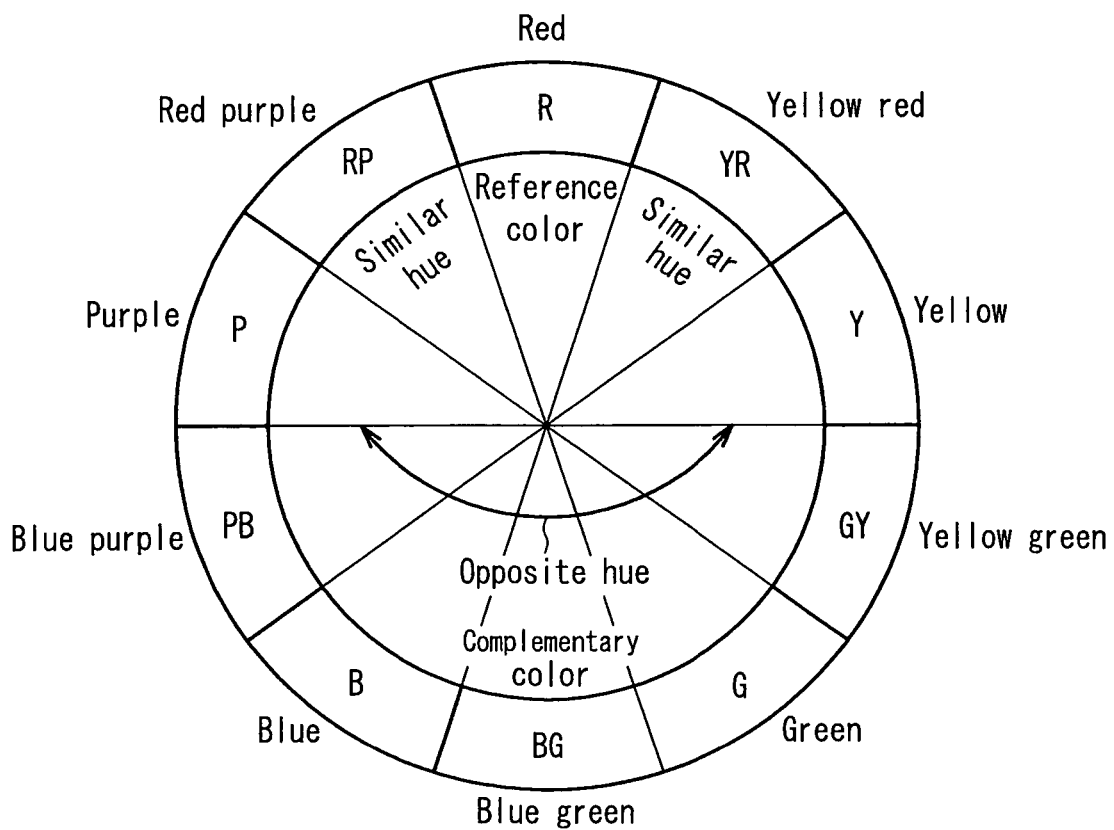
FIG. 12 is a hue circle diagram showing a relationship between a reference hue and an opposite hue, which is used in an example of the present invention.

Moreover, since at least one color of the hues that can be observed visually in the diffused light is substantially opposite hue to the hue of the retroreflected light, when the illumination light is projected onto the retroreflective sheet, the coloring becomes more vivid, thus being preferable. Herein, for example, in the case where red is a reference color in a hue circle including colors classified into ten basic groups (red, yellow red, yellow, yellow green, green, blue green, blue, blue purple, purple, red purple) as shown in FIG. 12, a color on the opposite side of the reference color is a complementary color, and five colors including this complementary color and respective two colors of hues on both sides of the complementary color are defined as the opposite hue.

In an enclosed lens type retroreflective sheet in which the retroreflective elements are enclosed in a resin, a focusing layer is formed on a rear surface of the glass spheres, and a metal reflective layer is formed on a rear surface side of the focusing layer, by using glass spheres having a refractive index of 2.10 or more for the retroreflective elements, the optimum film thickness of the focusing layer can be reduced, which is preferable for forming the focusing layer concentrically. At this time, a configuration where the surface layer and the resin layer are formed as a common layer is also possible.

In the retroreflective sheet in which the retroreflective elements are glass spheres having a refractive index of 2.10 or more, a focusing layer enclosing the glass spheres is formed, and a metal reflective layer is formed on a rear surface side of the focusing layer, the glass spheres are disposed at random positions in a thickness direction of the focusing layer, so that both of glass spheres that are in contact with the surface layer and glass spheres that are not in contact with the surface layer are present, and each of the glass spheres that are not in contact with the surface layer also are not disposed in a constant position. Thereby, even when light is incident from a position in a wide angle, the light can be retroreflected toward the direction that is substantially equal to the incident direction, and the observation angle can be increased. Thereby, retroreflected light of light that is projected onto the retroreflective sheet can be observed visually from a wider area, thus being preferable.

The glass spheres include: a glass sphere group B that is in contact with the surface layer; and a glass sphere group A that is positioned away from the surface layer, and the glass sphere group A achieves a reflective performance in an observation angle that is larger than an observation angle of the glass sphere group B, whereby the glass sphere group A can achieve the retroreflective performance in a wider observation angle than that of the glass sphere group B, thus being preferable.

The glass spheres include: a glass sphere group B that is in contact with the surface layer; and a glass sphere group A that is positioned away from the surface layer, a metal reflective layer of the glass sphere group B is formed at a focus formation position, and a thickness of a focusing layer of the glass sphere group A is smaller than a thickness of a focusing layer of the glass sphere group B, so that the glass sphere group A can achieve a retroreflective performance in an observation angle that is relatively larger than an observation angle of the glass sphere group B. Thereby, the designability and the visibility at night can be enhanced, thus being preferable.

The glass spheres include: a glass sphere group B that is in contact with the surface layer; and a glass sphere group A that is positioned away from the surface layer, a focusing layer of the glass sphere group B that is formed on the glass sphere concentrically has a film thickness that achieves a maximum reflective performance at an observation angle of 0.2° and an incident angle of 5°, a film thickness of a focusing layer of the glass sphere group A is smaller than the film thickness of the focusing layer of the glass sphere group B, and the glass sphere group A achieves a retroreflective performance in an observation angle that is larger than an observation angle of the glass sphere group B, whereby the visibility at night can be widened, and the effects for advertisement can be enhanced, thus being preferable.

The retroreflective elements are glass spheres having a refractive index ranging between 1.80 and 2.00 inclusive, and an encapsulated lens type in which a substantial lower hemisphere of the glass sphere that is covered with a metal reflective layer is held by the resin support sheet so as to be embedded in the resin support sheet, and air is enclosed on a surface side of the glass spheres, whereby the retroreflective performance at night can be further improved, thus being preferable.

The retroreflective element is a cube corner type, whereby the retroreflective performance at night in a relatively small observation angle can be improved further, thus being preferable.

The hue variable retroreflective sheet is flexible and stretchable, and can be attached onto a three-dimensionally curved surface. Thereby, the hue variable retroreflective sheet can be attached onto substrates with any shapes.

The hue variable retroreflective sheet is not risen from an aluminum substrate, and does not cause imperfection such as a crack and a breakage, when being attached to the aluminum substrate with a thickness of 1 mm that is set forth in a JISZ9117 7. testing method and being extruded in a depth of 5 mm with a spherical surface punch having a radius of 10 mm by using an Erichsen film strength tester that is set forth in JISB7729, so that the hue variable retroreflective sheet can be applied to the attachment onto the three-dimensionally curved surface and the extrusion molding, thus being preferable. The testing condition was determined so as to comply with the environment condition of 23±1° and 65±5% set forth in JISZ8703.

According to a configuration where the retroreflective elements are glass spheres having a refractive index of 2.10 or more and include: a glass sphere fixing layer; glass spheres and printing resin layer; a focusing layer; and a metal reflective layer in this order, the printing resin layer forms a mark. The glass spheres are disposed in the glass sphere fixing layer, the glass sphere and the printing resin layer are disposed so as not to be positioned overlapping with each other when being observed from the surface layer in a thickness direction of the retroreflective sheet. The metal layer on the rear surface of the retroreflective sheet can be seen through from the surface layer side without being shielded by the glass spheres, and thus the counterfeit preventing logo mark can be observed visually in a metallic tone. The retroreflected light and the mirror-reflected light provide different hues, the hue variable retroreflective sheet is preferable as a security film that has various types of high designability.

The retroreflective sheet of the present invention is useful as a designable film that is colorful and has two or more multicolor during daytime, as a replacement for the conventional retroreflective sheet that provides only monochromic designs with a single hue throughout day and night. And, according to the retroreflective film of the present invention, retroreflected light whose hue is different from the hue that can be provided during daytime can be obtained by the projection of light at night, and a hue that is different from that of the retroreflected light appears when the retroreflective sheet is seen from an opposite side of the projection of the light. Thus, a new retroreflective sheet that generates multicolor throughout day and night can be provided. Moreover, by adjusting a reflective performance of the individual glass sphere that achieves the retroreflection, the glass spheres are classified into: a glass sphere group that functions to maintain the reflective performance at a small observation angle up to a large incident angle; and a glass sphere group that functions to maintain the reflective performance at a larger observation angle up to a large incident angle, and the glass sphere groups achieve the respective functions, thereby obtaining the retroreflective sheet having super-wide angle visibility with excellent utilities. Thereby, almost whole continuous regions of the reflected light showing the retroreflectivity and the reflected light showing the mirror-reflectivity can be observed visually at night, and the retroreflective sheet that has remarkably high designability throughout day and night can be manufactured, thus being more preferable.

In order to achieve such a performance, it is preferable to use optical coherent materials described below, which has a function to reflect light, changes in color depending on a point of view, and includes a core material having a surface that is covered with one or more substantially transparent coating layers. Examples of the optical coherent coloring material include: an optical coherent pigment that is obtained by coating a core material such as mica, titanium, titanium dioxide, aluminum, aluminum oxide, silicon dioxide, iron oxide and glass flakes with one or more layers of iron oxide, tin oxide, titanium dioxide, silicon dioxide, magnesium fluoride, chromium or the like; a cholesteric liquid crystal polymer having a helical structure; and the like. A particularly preferable example thereof is an optical coherent pigment that uses a material that does not substantially transmit light and reflect the light as the core material, and the core material is covered with one or more coating layers that are substantially transparent and have a function of mirror-reflecting by an interface between any of the layers. And, it is more preferable to use an optical coherent pigment that reflects about 50% of incident light by any of the interfaces of the coating layers, and reflects the remaining about 50% incident light by the core material, because of providing a highest optical interference effect and thus enabling the visual observation of the sharp interference light. Examples of such an optical coherent pigment include: Xirallic series (produced by MERCK JAPAN, LTD.) such as a titanium oxide coating type using aluminum oxide as the core material and an iron oxide coating type using aluminum oxide as the core material; Valiocrom (produced by BASF Inc.) such as a double-layer coating type using aluminum as the core material, in which a silicon dioxide coating further is coated with iron oxide, and a double-layer coating type using plate iron oxide as the core material, in which a silicon oxide coating is further coated with iron oxide; CHROMAFLAIR (produced by Flex Products Inc.) using aluminum as the core material, in which a magnesium fluoride coating is further coated with an extremely thin chromium layer; and the like. Moreover, examples of the material used as the core material, which does not substantially transmit light and reflects the light, include various metals and metal alloys, but non-metallic reflective material can be used as well. Appropriate metal materials include: aluminum; silver; copper; gold; platinum; tin; titan; palladium; nickel; cobalt; rhodium; niobium; chromium; compounds of them; combination of them; and alloys of them. Among them, aluminum is particularly preferable, because of its particularly high reflectivity and its utility.

Next, a method for manufacturing such a hue variable retroreflective sheet will be described. In FIG. 1, the reference numeral 1 represents a surface layer of the enclosed lens type retroreflective sheet. The optical coherent coloring material that is added in a state of being dispersed in the transparent surface layer preferably is dispersed in at least one or more layers of the surface layer. Examples of the material of the surface layer that is used at this time include: fluoro-olefin copolymers; polyester resins; alkyd resins; polyurethane resins; vinyl resins; silicone acrylic resins; and acrylic resins; and the above-described resins and the like having a reactive functional group, to which a hardener that reacts with the reactive functional group, such as amino resins, epoxy resins, polyisocyanate and block polyisocyanate and/or a hardening catalyst are blended. Herein, a component of each of the above-described base resins may be used alone or in combination of two kinds or more. As an application form, either of a solvent type, a non-water-dispersion type, a water-soluble type and a water-dispersion type can be used, but the solvent type is particularly preferable.

To the above-described composition that is used for forming the surface layer, an ultraviolet absorber and/or an antioxidant may be added so as to allow the surface layer to contain them, thereby further improving long-term durability.

As the ultraviolet absorber, known conventional agents can be used. Typical examples of the ultraviolet absorber include: hydroxybenzophenone compounds; salicylate ester compounds; anilide oxalate compounds; benzotriazole compounds; unsaturated nitrile compounds; and the like. Typical examples of the antioxidant include: hindered amine compounds; hindered phenol compounds; phosphite compounds; and the like.

More specifically, the surface layer is formed on a biaxially drawn polyethylene terephthalate film obtained by treating or not treating both surfaces of these resins so as to provide easy adhesion. In the case of using the biaxially drawn polyethylene terephthalate film whose both surfaces are treated to have easy adhesion, it is used as a part of the surface layer of the final product, but in the case of using the biaxially drawn polyethylene terephthalate film whose both surfaces are not treated to have easy adhesion, it is released and removed before completing the final product. In the case where the surface layer is composed of two or more layers, the above-described synthetic resins may be used alone or in combination of two kinds or more for forming each layer.

Moreover, a method for forming the surface layer will be described. In the case of using the biaxially drawn polyethylene terephthalate film whose both surfaces are treated to have easy adhesion as a part of the surface layer of the final product, it is preferable to complete the surface layer by: sequentially forming the below-described glass sphere fixing layer, embedding the glass spheres, forming the focusing layer and the metal reflective layer on one of the surfaces of the film; then attaching a pressure-sensitive adhesive layer with a release film; and thereafter applying and drying the above-described resins for the surface layer sequentially on the other surface of the film so as to laminate them.

The optical coherent coloring material is added to be dispersed in the surface layer, and herein, it is preferable that the optical coherent coloring material is dispersed in any one or more layers of the surface layer that is composed of one or more layers. For example, in the case where the surface layer is composed of one layer, the optical coherent coloring material may be added to be dispersed in the surface layer, and in the case where the surface layer is composed of two or more layers, the optical coherent coloring material preferably is dispersed in an outermost layer and/or any one or more of the layers beneath the outermost layer.

In the case of dispersing the optical coherent coloring material, if the optical coherent coloring material is aligned in parallel with the transparent surface layer as far as possible, incident light into each particle of the optical coherent coloring material is reflected regularly in a certain direction, ideal gloss can be obtained, and any of wavelengths of visible light beams interfere with each other due to a thickness of the optical coherent coloring material, whereby rainbow colors appear, thus being preferable. However, in the case where the alignment is not sufficient, scattering of light occurs and the rainbow colors do not appear, thus being not preferable. As mentioned above, for aligning the optical coherent coloring material ideally, a film thickness of the layer in which the optical coherent coloring material is dispersed is set to be 80 μm or less, preferably 70 μm or less, and more preferably 60 μm or less, whereby the optical coherent coloring material that is dispersed uniformly in a solution of the resin composition used for the surface layer can be aligned in substantially parallel with the surface layer, in a process of volatilizing and drying a solvent of the solution so as to form a film, thus being preferable.

Moreover, for coloring the retroreflected light during the projection of light at night, in a process in which the retroreflected light passes through the retroreflective sheet, a light beam that is incident from the surface layer passes through the retroreflective element. Then, in the case of the enclosed lens type, the incident light passes through a focusing resin layer, and subsequently is retroreflected by the metal reflective layer. Whereas, in the case of the cube corner type, the incident light is totally reflected in a part of a rear surface of the retroreflective element that is in touch with air, and then is retroreflected toward the light source direction passing through the same path as that of the incident light beam again. If the layers of the sheet that the retroreflected light passes through is colored, the retroreflected light is colored light. Herein, with the colored layer that is positioned further beneath the optical coherent layer in which the optical coherent coloring material is dispersed uniformly, the retroreflective sheet can have a function to generate hues in two or more colors that differ depending on a point of view in diffused light, a function to mirror-reflect the incident light and a function to color the retroreflected light, thus being preferable.

The optical coherent layer can contain a coloring material for coloring the retroreflected light, but in this case, when a content of the coloring material is $\alpha$ and a content of the optical coherent coloring material is $\beta$, a weight ratio of $\alpha/\beta$ is preferably 0.45 or less, and more preferably is 0.35 or less, which does not degrade the coherence of light in the diffused light, and further can color the retroreflected light.

In the case of the enclosed lens type retroreflective sheet in which the glass sphere is enclosed as the retroreflective elements in the resin, as the colored layer that colors the above-described retroreflected light, at least one of the surface layer, the glass sphere fixing layer and the focusing layer may be colored, and it is more preferable that at least one of the surface layer and the focusing layer further is colored, because the retroreflected light can be colored more efficiently. Moreover, in the case of the encapsulated lens type retroreflective sheet in which air is enclosed on the surface side of the glass spheres, it is preferable to color the surface layer. Furthermore, in the case where the retroreflective elements are the cube corner type, it is preferable to color either one or both of the surface layer and the retroreflective elements.

Moreover, in the enclosed lens type retroreflective sheet, since the retroreflected light is obtained by retroreflecting the incident light that has passed through the glass spheres as the retroreflected light, almost all of the retroreflected light is retroreflected without passing through the glass sphere fixing layer. Therefore, if the glass sphere fixing layer is colored, a matching ratio with the passing path of the retroreflected light becomes extremely low, and thus a concentration of a color of the diffused light when being observed visually in the diffused light can be improved, by hardly changing a concentration of the color of the retroreflected light. Furthermore, since an increased ratio of the light, which is transmitted by the layer in which the optical coherent coloring material is added to be dispersed, is absorbed in the glass bead fixing layer, a background color becomes darkened, a color intensity of the reflected color of the optical coherent coloring material is increased, and a chroma is improved, thus being preferable.

As the coloring material for coloring the retroreflected light, a colored paint containing a pigment or a dye as the paint for forming each layer can be used. Examples of the pigment that can be used to obtain such a colored paint include known organic pigments such as Phthalocyanine Blue, Phthalocyanine Green, Quinacridone Red, Hanza Yellow and Perinone Orange, and known inorganic pigments such as iron oxide red, iron oxide yellow, titanium white and cobalt blue.

If an amount of the optical coherent coloring material to be added into the optical coherent layer can maintain the total visible light transmittance of whole the optical coherent layer in which the optical coherent coloring material is added to be dispersed to be 30% or more, preferably 40% or more, and more preferably 50% or more, the retroreflected light that is colored when the illumination is projected onto the retroreflective sheet at night can be returned efficiently, and the retroreflective performance preferably is maintained.

Moreover, for obtaining sharp retroreflected light, it is preferable that the total visible light transmittance of the optical coherent layer is higher than the total visible light transmittance of the colored layer that colors the retroreflected light.

Furthermore, as important points to color the retroreflected light, it is extremely preferable, for enhancing the designability and the sharpness of the colored retroreflected light, that the color tone changes depending on the point of view, the optical coherent coloring material with excellent transparency can be observed visually in the diffused light, and at least one color of: the hue in at least one color of the hues in two or more colors that differ depending on the point of view; and the hue of the retroreflected light is an achromatic color.

Moreover, for enhancing the designability and the sharpness of the colored retroreflected light, it is extremely preferable that the color tone changes depending on the point of view, the optical coherent coloring material with excellent transparency can be observed visually in the diffused light, and the hue in at least one color of the hues in two or more colors that differ depending on the point of view is a substantially opposite hue with respect to the hue of the retroreflected light. As defined above, the opposite hue described here represents the five colors including the complementary color and respective two colors of hues on both sides of the complementary color, where, when, for example, red is the reference color in a hue circle including the colors classified into the ten basic groups (red, yellow red, yellow, yellow green, green, blue green, blue, blue purple, purple, red purple) as shown in FIG. 12, the color on the opposite side of the reference color is a complementary color.

Next, a method for manufacturing the enclosed lens type retroreflective sheet in which the glass spheres as the retroreflective elements are enclosed in the resin will be described, from a step of forming the glass sphere fixing layer to a step of obtaining the final product. Herein, as described above, in the case of using the biaxially drawn polyethylene terephthalate film whose both surfaces are treated to have easy adhesion, the glass sphere fixing layer is formed on the polyethylene terephthalate film. In the case of using the biaxially drawn polyethylene terephthalate film whose both surfaces are not treated to have easy adhesion, the glass sphere fixing layer is formed on the surface layer that is laminated with the resin composition for the surface layer. Herein, examples of the typical paint used for the glass sphere fixing layer include: fluoro-olefin copolymers; polyester resins; alkyd resins; polyurethane resins; vinyl resins; silicone acrylic resins; acrylic resins; and the above-described resins and the like having a reactive functional group, to which a hardener that reacts with the reactive functional group, such as amino resins, epoxy resins, polyisocyanate and block polyisocyanate and/or a hardening catalyst are blended. Herein, a component of each of the above-described base resins may be used alone or in combination of two kinds or more. As a form of the paint, any of a solvent type, a non-water-dispersion type, a water-soluble type and a water-dispersion type can be used, but the solvent type is particularly preferable.

Next, a refractive index of the glass spheres composing the enclosed lens type retroreflective sheet is 2.10 or more, preferably ranges from 2.10 to 2.40, and more preferably ranges from 2.15 to 2.35. Moreover, a particle diameter of the glass spheres ranges from 5 μm to 300 μm, preferably ranges from 20 μm to 100 μm, and more preferably ranges from 40 μm to 70 μm. When the particle diameter of the glass spheres is less than 5 μm, the required film thickness of the focusing layer is extremely small, which makes it difficult to control the film thickness. Whereas, when the particle diameter of the glass spheres is more than 300 μm, the required film thickness of the focusing layer is extremely large, which makes it difficult to form the resin concentrically with the spherical diameter of the glass spheres, due to the flow of the resin in a heating process while forming the focusing layer. When the refractive index is less than 2.10, the required film thickness of the focusing layer is extremely large, which makes it difficult to form the resin concentrically with the spherical diameter of the glass spheres. Furthermore, in the case of manufacturing the glass spheres with the refractive index that is more than 2.4, it is extremely difficult to prevent crystallization and industrially manufacture the transparent glass spheres with high precision.

In the typical paint to be used for forming the focusing layer, polyurethane resins, polyvinyl acetal resins, acrylic resins, alkyd resins, and polyester resins are used as a base polymer component. They may be used as non-crosslinking types, or may be used as thermosetting types by blending hardeners such as amino resins, epoxy resins, polyisocyanate, and block polyisocyanate. As the form of the paint for the focusing layer, the various types of paints that are similar to the paint for the glass sphere fixing layer can be used.

A method for manufacturing a retroreflective sheet (type B) with a further improved wide-angle property from that of the above-described enclosed lens type retroreflective sheet (type A) will be described below.

In both of the type A and the type B, the metal reflective layer is formed on the focusing layer, and a pressure-sensitive adhesive layer and a release material are laminated on the metal reflective layer.

Moreover, when manufacturing the surface layer of both of the type A and the type B, in the case where the process film uses a biaxially drawn polyethylene terephthalate film whose both surfaces are subjected to a treatment for providing easy adhesion, such as a corona discharge treatment and resin coating, two or more layers of the surface layer, which are obtained by forming one surface layer on one surface of the film, also may be used.

In the case of the type B, a focusing layer resin solution in which the glass spheres are dispersed is applied on the surface layer, this coating is heated to be dried, and 50 to 90 wt % of the glass spheres are allowed to settle until coming into contact with the surface layer, but the individual glass spheres that settle to the surface layer arrive at different times, and it is important that the settling of the glass spheres that come into contact with the surface layer first should be stopped at the position where the glass spheres come into contact with the surface layer, so that they do not sink any further into the inside of the surface layer.

What is required to accomplish this is, of course, that the curing of the focusing layer be promoted to suppress the settling of the glass spheres, but since the glass spheres settle at different times as mentioned above, to prevent the glass spheres that arrive first at the surface layer from sinking in any further, the surface layer needs to have enough resistance to prevent the glass spheres from sinking therein. The first performance condition required for this resistance is that the surface layer does not dissolve upon coming into contact with the solvent used in the solution for the focusing layer. The surface layer also needs to have enough heat resistance so that it is not softened so as to allow the glass spheres to sink into the surface layer at the temperature range for the drying and curing of the resin for the focusing layer.

This is because if the glass spheres sink further into the surface layer, there would be a shift in the individual positions of the 50 to 90 wt % of the glass spheres that are charged with handling the reflective performance at a relatively small observation angle, and the desired reflective performance could not be attained. As a result of various studies, the present inventors confirm that the desired reflective performance can be attained, and a focusing layer that is concentric with the glass spheres can be formed, by ensuring that no more than 10% of the particle diameter of the glass spheres sink into the surface layer.

The metal reflective layer is provided on the focusing layer, and can be formed of the below-described metals. A thickness of the metal reflective layer varies depending on the metal to be used, but it ranges from 5 nm to 200 nm, and preferably ranges 10 nm to 100 nm. In the case where the thickness of the metal reflective layer is less than 5 nm, the shielding performance of the metal reflective layer is not sufficient, and thus does not function as the reflective layer. On the other hand, in the case where the thickness of the metal reflective layer is more than 200 nm, a crack is likely to be generated in the metal reflective layer, and its manufacturing cost is increased, and thus is not preferable. A method for providing the metal reflective layer is not particularly limited, and ordinary vapor deposition, sputtering, transfer, plasma process and the like can be used. The vapor deposition and the sputtering particularly preferably are used in terms of the workability. Also, the metal to be used for forming the metal reflective layer is not limited particularly, and for example, metals such as aluminum, gold, silver, copper, nickel, chromium, magnesium, zinc and the like can be used. Among these, considering the proccessability, the ease of forming the metal reflective layer, the reflective efficiency of light, the durability and the like, aluminum, chromium and nickel are particularly preferable. Herein, the metal reflective layer also may be formed by an alloy that is composed of two or more different metals.

The conditions for the drying that is performed after the application of the paint for forming the above-described surface layer and the focusing layer enclosing the glass spheres are determined so that the desired state can be realized as appropriate, according to the kind and the amount of the base resin that is used as the material for the paint, the reactive functional group in the. base resin, the hardener and the hardening catalyst to be added, and the kind of the solvent.

Examples of the resin composing the pressure-sensitive adhesive layer of the present invention include acrylic resins and rubber-based resins, such as natural rubber, synthetic rubber and the like. It is particularly preferable to use, as the acrylic resin, a macromolecular acrylic resin containing at least one of an acrylate copolymer and an acrylic prepolymer as a main component, or a modified acrylic resin in which a tackifier and a monomer providing a cohesive power further are added into the above-described acrylic resins.

A manufacturing method for further adding a security performance to the hue variable retroreflective sheet of the present invention will be described below. In the method for manufacturing the hue variable retroreflective sheet in which the glass sphere fixing layer, the glass sphere and printing resin layer and the focusing layer are laminated sequentially on the above-described surface layer, and the metal reflective layer further is formed for coating on the focusing layer, the surface layer and the glass sphere fixing layer are laminated sequentially, a predetermined counterfeit preventing logo mark as the printing resin layer is printed on the rear surface side of the glass sphere fixing layer, the resin composition containing a room temperature setting resin as a main component in the printed part is hardened, the glass sphere fixing layer subsequently is heated to a temperature for providing pressure-sensitive adhesiveness, the glass spheres are embedded into the glass sphere fixing layer, where, at this time, the glass spheres are not embedded into the printed part because the pressure-sensitive adhesiveness is not generated in the printed part of the logo mark, the focusing layer further is laminated subsequently, and the metal reflective layer further is formed for coating on the focusing layer, thereby manufacturing the hue variable retroreflective sheet that is provided with the security performance. If the glass spheres are embedded into the glass sphere fixing layer according to this method, the glass spheres are not embedded into the printed part, and thus the metal layer on the rear surface side of the retroreflective sheet can be seen through from the surface layer side without being shielded by the glass spheres, whereby the counterfeit preventing logo mark can be observed visually in a metallic tone.

Moreover, as the retroreflective element, a glass sphere having the metal reflective layer on its hemisphere, a cube corner type retroreflective element and the like can be used. Furthermore, as mentioned above, the retroreflective elements are held by at least one of the resin support sheet and the cover film, but herein, the encapsulated lens type retroreflective sheet in which the hemispherical surface side of the glass spheres that are covered with the metal retroreflective layer is held in the resin support sheet so as to be embedded therein will be exemplified. Herein, in the case of the cube corner type retroreflective element, it is held by the cover film.

Figure 4:
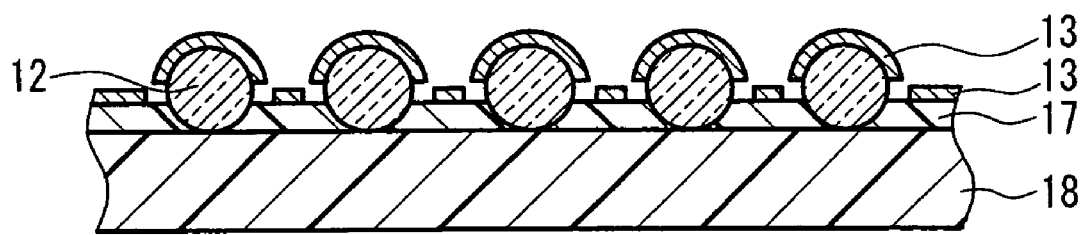
FIG. 4 is a cross-sectional view showing a manufacturing process of a hue variable retroreflective sheet that is applied to a encapsulated lens type retroreflective sheet of an example of the present invention.
Figure 5:
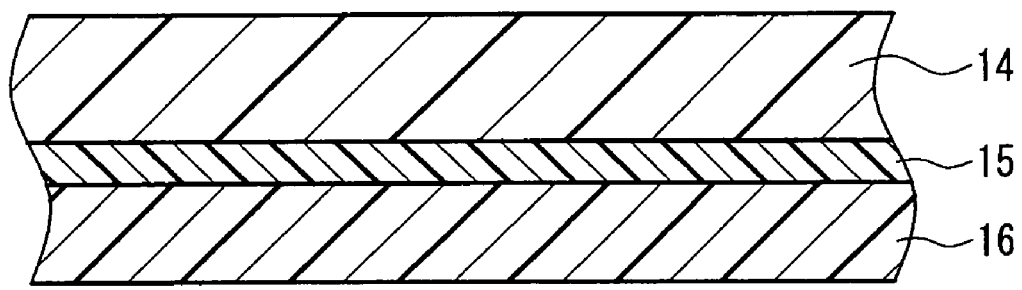
FIG. 5 is a cross-sectional view showing a manufacturing process of the hue variable retroreflective sheet.
Figure 6:
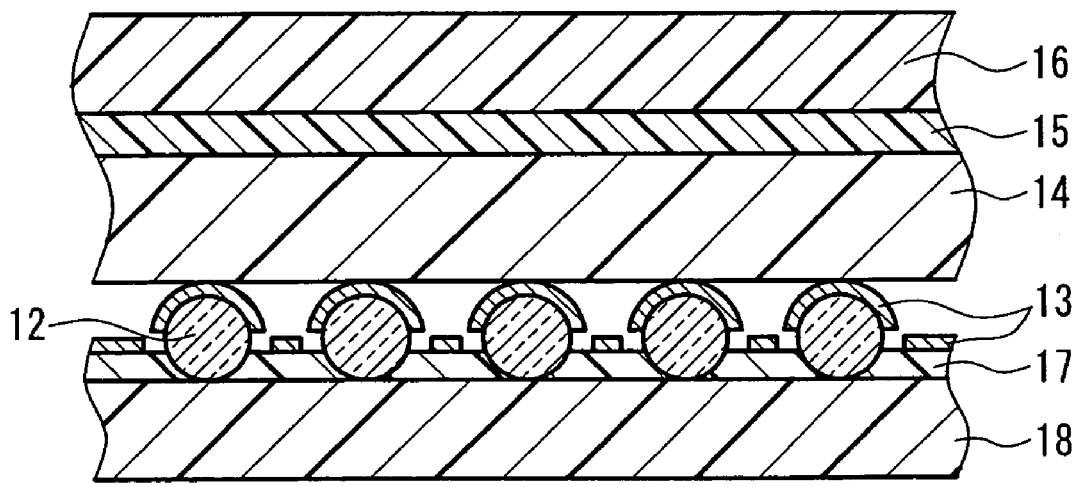
FIG. 6 is a cross-sectional view showing a manufacturing process of the hue variable retroreflective sheet.
Figure 7:
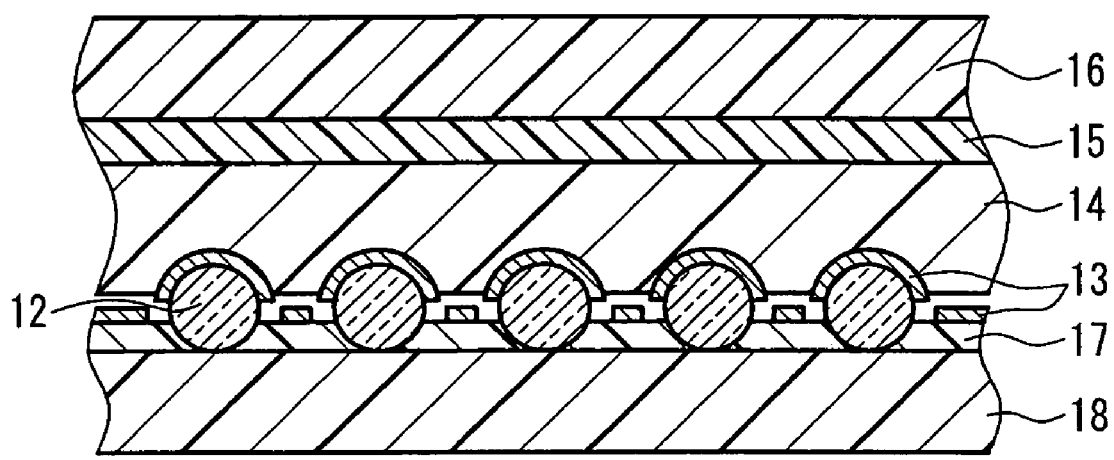
FIG. 7 is a cross-sectional view showing a manufacturing process of the hue variable retroreflective sheet.
Figure 8:
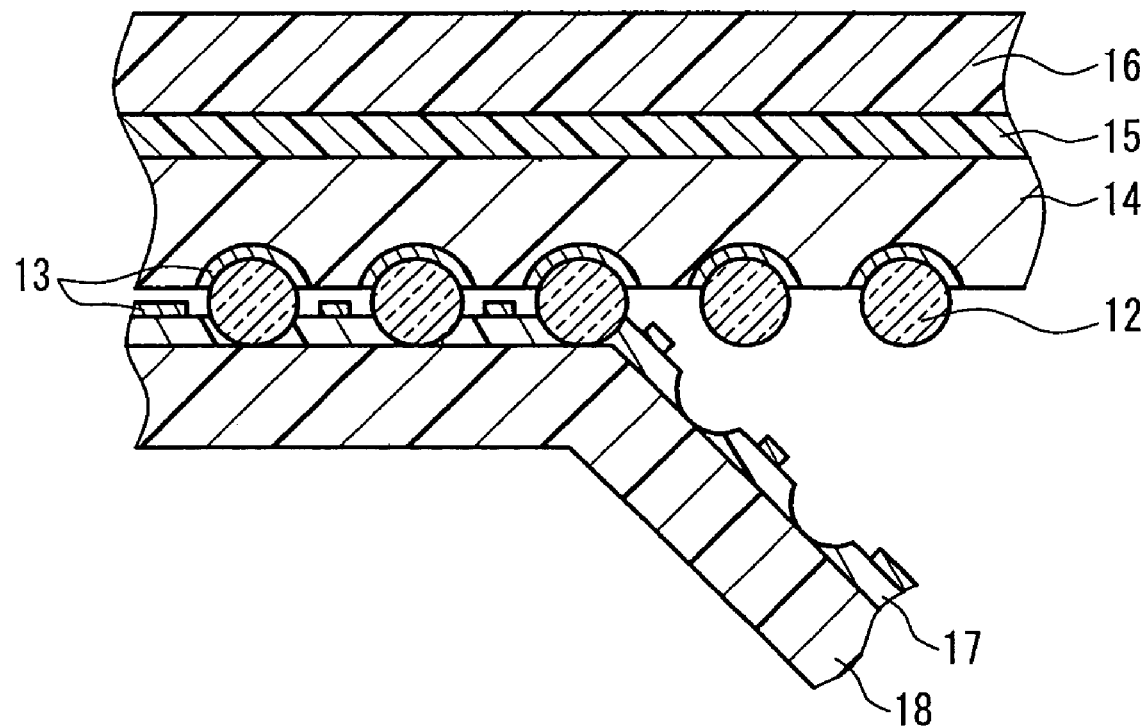
FIG. 8 is a cross-sectional view showing a manufacturing process of the hue variable retroreflective sheet.
Figure 9:
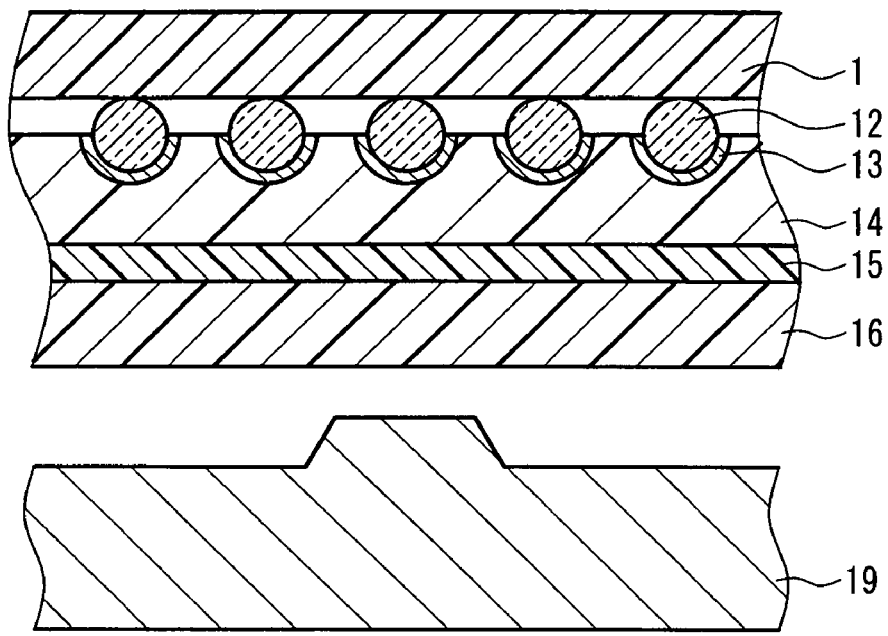
FIG. 9 is a cross-sectional view showing a manufacturing process of the hue variable retroreflective sheet.
Figure 10:
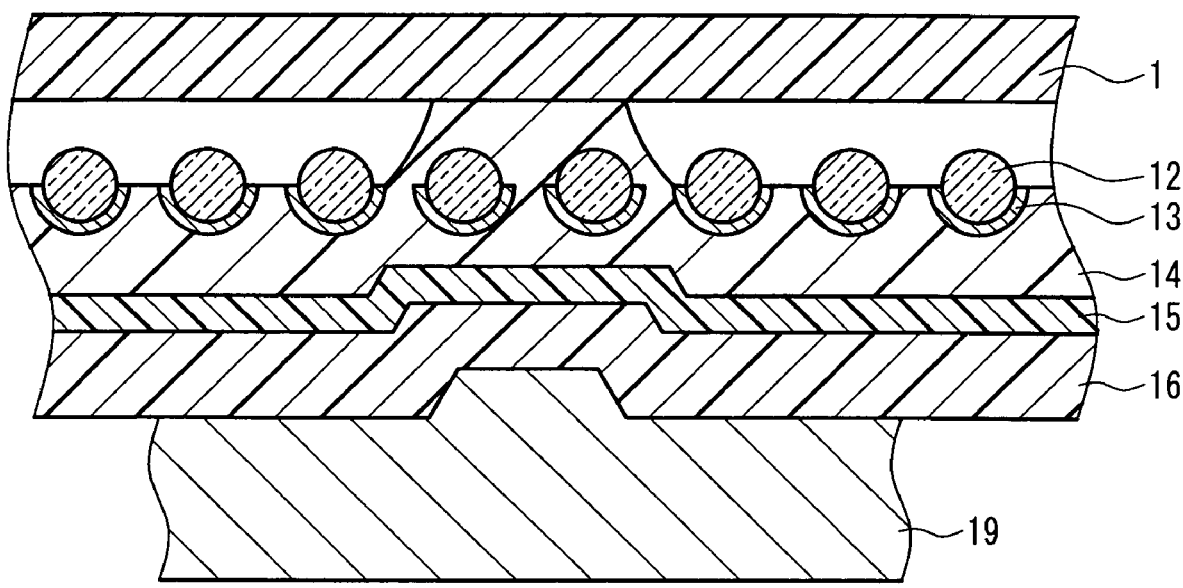
FIG. 10 is a cross-sectional view showing a manufacturing process of the hue variable retroreflective sheet.

First, the metal reflective layer is formed on the hemisphere of the glass spheres. As shown in FIG. 4, a plurality of the glass spheres 12 are embedded into a surface of a glass sphere temporarily fixing layer 17 made of polyethylene that is laminated on a polyester film 18 as a first film. For embedding the glass spheres 12, a laminate of the glass sphere temporarily fixing layer 17 and the polyester film 18 is heated so as to soften the polyethylene, whereby the glass spheres 12 sink into the glass sphere temporarily fixing layer 17. A particle diameter of the glass spheres ranges, for example, from about 5 µm to 300 µm, preferably ranges from about 20 µm to 90 µm, and more preferably ranges from 40 µm to 80 µm. A refractive index of the transparent spheres ranges, for example, from about 1.8 to 2.1, preferably ranges from about 1.9 to 1.95, and more preferably ranges from 1.92 to 1.93. Next, on the surface of the hemisphere of the glass spheres 12 that is exposed from the surface of the glass sphere temporarily fixing layer 17, the metal reflective layer 13 is formed by vapor deposition. Examples of a material of the metal reflective layer 13 include: aluminum; gold; silver; copper; nickel; chromium; tin; alloys containing these metals; titanium oxide; titanium nitride; and the like, which have excellent reflectivities of light, and among them, aluminum is preferable. Next, as shown in FIG. 5, a primer layer 15 is formed separately on the polyester film 16 as a supported film, and the resin support sheet 14 is formed thereon. In the case of the type that does not include the primer layer 15, the process for manufacturing the primer layer may be omitted. Next, as shown in FIGS. 6 to 7, the resin support sheet 14 is placed along the glass sphere temporarily fixing layer 17, and the resin support sheet 14 is pressed onto the surface of the glass sphere temporarily fixing layer 17. This is performed so that the glass spheres 12 whose substantially hemispherical surface is covered with the metal reflective layer 13 may be embedded into the resin support sheet 14. Thereafter, as shown in FIG. 8, the glass sphere temporarily fixing layer 17 is released from the surface of the resin support sheet 14 together with the polyester film 18. At this time, the glass spheres 12 is transferred into the resin support sheet 14, and is held by the resin support sheet 14 in a state where its hemisphere is embedded therein. Next, as shown in FIGS. 9 to 10, the encapsulated lens type retroreflective sheet, in which the surface of the resin support sheet 14 is covered with a surface layer film 1 that has been manufactured separately, heat press forming is performed by using a patterned embossing roll 19, the resin support sheet 14 and the surface layer film 1 are disposed so as to be in contact with each other. Thereby, the hemispherical surface of which the substantially lower hemisphere is covered with the metal reflective layer 13 is held by the resin support sheet 14 so as to be embedded therein, and air is enclosed on the surface side of the glass spheres, can be manufactured.

In the case of the encapsulated lens type retroreflective sheet, the surface layer film corresponds to the surface layer of the present invention, and the optical coherent coloring material and the coloring material that are added to the optical coherent layer and the colored layer are all added to be dispersed in the surface layer film, but their manufacturing methods, configurations and the like may be the same as those of the above-described enclosed lens type retroreflective sheet.

Figure 11:
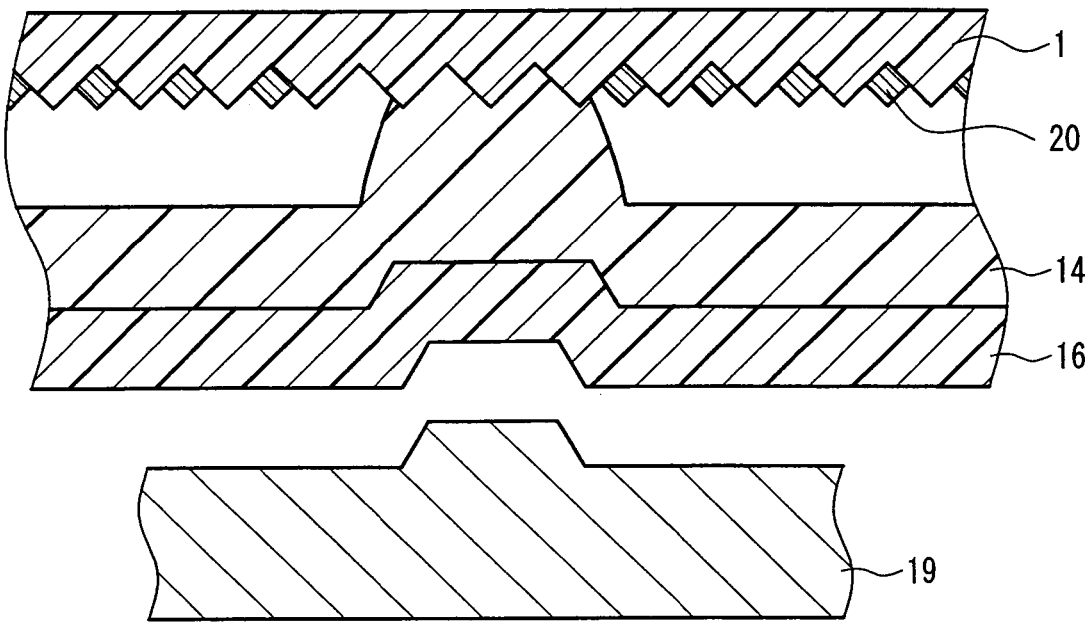
FIG. 11 is a cross-sectional view showing a manufacturing process of a hue variable retroreflective sheet that is applied to a cube corner type retroreflective sheet of an example of the present invention.

Furthermore, in the case of the cube corner type, as shown in FIG. 11, the surface layer film 1 corresponds to the surface layer of the present invention, similarly to the encapsulated lens type retroreflective sheet, but a coloring material such as a dye and a pigment can be added further to the cube corner type retroreflective element 20 so as to color the retroreflected light. In FIG. 11, the reference numeral 14 represents the resin support sheet, 16 represents the polyester film, and 19 represents the embossing roll.

As another manufacturing method, for coloring the retroreflected light, the retroreflective sheet in which the coloring material is added in advance to any of the layers composing the retroreflective sheet may be attached to the surface layer film including the optical coherent layer in which the optical coherent coloring material is added to be dispersed, by using a pressure-sensitive adhesive, an adhesive or the like, so that the hue variable retroreflective sheet of the present invention can be manufactured as well.

EXAMPLES

The present invention will be described below by way of examples. Numerals of "part" and "%" indicating mixing proportions in the below examples refer to weight parts and weight percent unless otherwise specified. Moreover, the same reference numerals are assigned to the same parts or the same elements in the figures unless otherwise specified.

Example 1

FIG. 1 is a cross-sectional view showing the hue variable retroreflective sheet of the present example, where the reference numeral 1 represents a surface layer, 2 represents a glass sphere fixing layer, 3 represents a focusing layer, 4 represents glass spheres, 5 represents a metal reflective layer, 6 represents a pressure-sensitive adhesive layer, and 7 represents a release material.

The surface layer 1 shown in FIG. 1 was manufactured. An example of a resin composition for the surface layer 1-1 containing: about 100 parts of Fluonate K-700 (produced by Dainippon Ink & Chemicals, weight average molecular weight: about 70,000, hydroxyl value of solids: 48, non-volatile content: about 50%); about 15 parts of SUMIMAL M-100C (methylated melamine resin produced by Sumitomo Chemical Co., Ltd., non-volatile content: about 100%) as a hardener; about 1.3 parts of NACURE-3525 (produced by King Industries, Inc., dinonyl naphthalene disulfonic acid) as a hardening catalyst; about 1 part of TINUVIN 900 (ultraviolet absorber); and about 1 part of TINUVIN 292 (antioxidant) was applied onto a polyester film whose both surfaces were not treated to have easy adhesion as a supported film so as to provide a dry film thickness of about 20 µm, which subsequently was heated to be dried at about 140° C. for about 10 minutes, thereby obtaining the surface layer 1-1. Thereafter, a surface layer 1-2 (optical coherent layer), in which an optical coherent pigment was added to be dispersed, was manufactured on the surface layer 1-1 that already was manufactured as described above. Herein, an example of the resin composition containing: about 100 parts of Bumock D6-439 (alkyd resin produced by Dainippon Ink & Chemicals, hydroxyl value of solids: 140, non-volatile content: about 80%); about 82 parts of Burnock DN-980 (polyisocyanate prepolymer produced by Dainippon Ink & Chemicals, nonvolatile content: about 75%) as a hardener; and 3.5 parts of Variocrm Magic Gold L 1400 (produced by BASF Inc., optical coherent pigment) was applied so as to provide a dry film thickness of about 20 μm, which was heated to be dried at about 140° C. for about 10 minutes, thereby obtaining the surface layer 1-2 (optical coherent layer). Subsequently, a surface layer 1-3 (colored layer) that colors the retroreflected light was manufactured on the surface layer 1-2 (optical coherent layer) that was manufactured as mentioned above. Herein, an example of the resin composition containing: 100 parts of Bekkolite M-6401-50 (produced by Dainippon Ink & Chemicals, solid content: 60%); 20 parts of Super Beckamine J-820-60 (produced by Dainippon Ink & Chemicals, butylated melamine resin, solid content: 60%); 1 part of Beckamine P-198 (produced by Dainippon Ink & Chemicals, hardening catalyst); 9.0 parts of DICTON BLUE HD-6272 (produced by Dainippon Ink & Chemicals, processed pigment for oil-based paint, pigment concentration: 10%); and 0.2 parts of DICTON RED HD-6112A (produced by Dainippon Ink & Chemicals, processed pigment for oil-based paint, pigment concentration: 6%) was applied so as to provide a dry film thickness of about 20 μm, which was subsequently heated to be dried at about 140° C. for about 10 minutes, thereby obtaining the surface layer 1-3 (colored layer).

Thereafter, a resin composition for the glass sphere fixing layer was prepared by using: 100 parts of Bekkolite M-6401-50; 10.0 parts of Super Beckamine J-820-60; 0.5 parts of Beckamine P-198 (produced by Dainippon Ink & Chemicals, curing accelerator, acid value: 400); and 10.0 parts of POLYCIZER W-360-ELS (produced by Dainippon Ink & Chemicals, macromolecular plasticizer). This composition was applied on the above-described surface layer 1-3 (colored layer) so as to provide a dry film thickness that was about 70% of a spherical diameter of the glass sphere, which was dried at room temperature so as to volatilize its solvent, then the glass spheres were embedded therein, and it further was dried at 140° C. for 5 minutes.

Herein, as the glass spheres, high-refractive-index glass spheres containing titanium oxide as a main component, which had a refractive index of 2.23 and a particle diameter ranging from 55 μm to 65 μm, were used.

A resin composition for the focusing layer was prepared by using: 100 parts of a polyurethane resin Burnock L8-974 (produced by Dainippon Ink & Chemicals); and 10 parts of Super Beckamine J-820-60. This composition was applied onto the above-described glass spheres so as to provide a dry film thickness of about 14 μm, which was dried at 100° C. for 10 minutes, and then further was heated to be dried at 140° C. for 10 minutes.

Aluminum was used as the metal reflective layer, and was applied onto the focusing layer by vacuum vapor deposition so as to provide a film thickness of 80 nm, thereby manufacturing the hue variable retroreflective sheet.

A surface of the thus obtained metal reflective layer of the reflective sheet and a pressure-sensitive adhesive layer with a thickness of about 35 μm, which was manufactured by applying on a release paper that is coated with silicone and drying a solution containing a mixture of 100 weight parts of an acrylic pressure-sensitive adhesive Finetack SPS-1016 (produced by Dainippon Ink & Chemicals); and 1 weight part of a crosslinking agent DN-750-45 (produced by Dainippon Ink & Chemicals), were attached to each other, and thereafter, the polyester film as the supported film was released, which provided the final product.

At this time, a total visible light transmittance of the optical coherent layer was 72%, and a hue of the optical coherent pigment changed from gold to gray (achromatic color) in diffused light. Moreover, a total visible light transmittance of the colored layer was 29%.

The hue variable retroreflective sheet manufactured in the present example changed from gold to blue purple in diffused light depending on a point of view, and a hue that could provide excellent designability could be observed. Moreover, when being irradiated with light at night, the retroreflected light glittered in pure blue, and a sharp interference color was observed in red purple to gold in a wider observation angle region due to an interference effect of mirror-reflected light by the optical coherent pigment. The retroreflective sheet provides an excellent decorative effect that could not be achieved by a conventional marking film and a conventional retroreflective sheet, and furthermore, an article using the hue variable retroreflective sheet attached thereto had remarkable designability and a high eye-catching effect.

Moreover, when the above-described final product was attached onto an aluminum substrate with a thickness of 1 mm that is set forth in the JISZ9117 7. testing method, and was pushed out by a depth of 8 mm with a spherical surface punch having a radius of 10 mm by using an Erichsen film strength tester that is set forth in JISB7729, the retroreflective sheet was not risen from the aluminum substrate, and did not cause an imperfection such as a crack and a breakage.

Example 2

Figure 3:
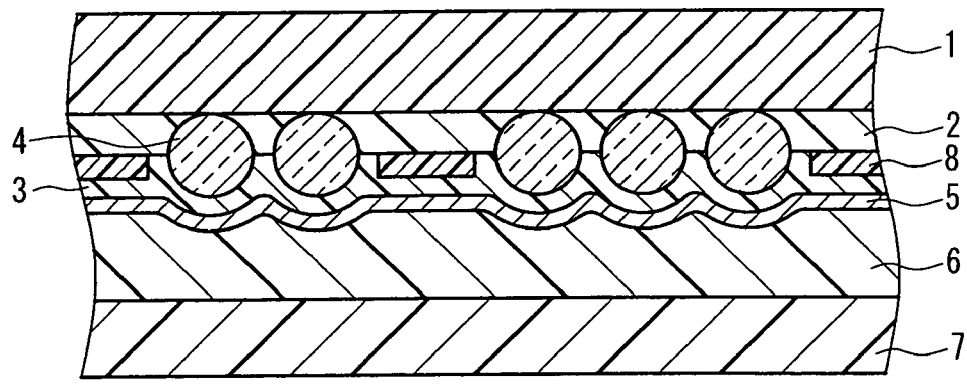
FIG. 3 is a cross-sectional view showing a hue variable retroreflective sheet that is applied to a retroreflective sheet for security of Example 2 of the present invention.

FIG. 3 is a cross-sectional view showing the hue variable retroreflective sheet of the present example, where the reference numeral 1 represents a surface layer, 2 represents a glass sphere fixing layer, 3 represents a focusing layer, 4 represents glass spheres, 5 represents a metal reflective layer, 6 represents a pressure-sensitive adhesive layer, 7 represents a release material, and 8 represents a printing resin layer.

A surface layer was manufactured similarly to the surface layer 1-2 (optical coherent layer) in Example 1, except for using 7.0 parts of CHROMAFLAIR GOLD/SILVER (produced by Flex Inc., optical coherent pigment) in place of Variocrm Magic Gold L 1400 that was used for manufacturing the surface layer 1-2 in Example 1.

Next, a resin composition for the glass sphere fixing layer was prepared by using: 5 parts of Bekkolite M-6401-50; 1.5 parts of Super Beckamine J-820-60; 0.5 parts of Beckamine P-198; 70 parts of an olefinic special copolymer Elvaloy 551 (produced by Du Pont-Mitsui Polychemical Co., Ltd., THF 25% solution); 15 parts (solid content of 45%) of an acrylic resin (composed of styrene/methyl methacrylate/a soft monomer, Tg: 50° C., hydroxyl value: about 14); and 3 parts of an epoxy plasticizer 0-130P (produced by ASAHI DENKA CO., LTD.). This composition was applied on the surface layer 1-3 (colored layer) so as to provide the glass sphere fixing layer with a dry film thickness of about 30 μm, which was heated at 70° C. for 5 minutes so as to volatilize its solvent. At this time, a probe tack strength was 3 gf. Herein, the probe tack means a tack strength that is measured by using a probe tack tester (produced by NICHIBAN CO., LTD., in conformity with ASTM D-2979) with a probe rod of 5 mmφ made of stainless steel having a mirror surface polished with AA#400, under a testing condition of: a releasing speed of 1 cm/second; a measurement load of 9.8±0.1 g (made of brass); a contact time of 1 second; measurement environment of 23±2° C.; and a relative humidity of 65±5%.

In the above-described state, the sheet was wound up, and a counterfeit preventing logo mark was printed on the glass sphere fixing layer by using a gravure printer in the next step. Herein, the resin composition contained: 100 parts of a hydroxyl group-containing acrylic resin (produced by Dainippon Ink and Chemicals, Inc., solid content: 45%, solvent: xylene, butyl acetate and toluene, hydroxyl value: 45); 23 parts of an isocyanate prepolymer (produced by Dainippon Ink and Chemicals, Inc., solid content: 75%, solvent: ethyl acetate, NCO content ratio: 15%) as a hardener; and 10 parts of butylcellosolve acetate.

Next, aging was performed at room temperature for about 1 week so that curing of the printed part could proceed. Thereafter, the thus printed sheet was heated at 120° C. for 1 minute so that the glass sphere fixing layer could generate pressure-sensitive adhesiveness, and the glass sphere (high-refractive-index glass sphere containing titanium oxide as a main component, with a refractive index of 2.23 and a particle diameter ranging from 67 μm to 73 μm) 3 was embedded into the glass sphere fixing layer, and further was dried at 140° C. for 5 minutes. A resin composition for the focusing layer 4 was adjusted by using: 100 parts of a polyurethane resin Burnock L8-974 (produced by Dainippon Ink and Chemicals, Inc.); and 10 parts of Super Beckamine J-820-60.

This composition was applied onto the glass sphere so as to provide a dry film thickness of 16 μm, which was dried at 100° C. for 10 minutes, and then further was dried at 140° C. for 10 minutes.

Processes after that were the same as those of Example 1, thereby completing the hue variable retroreflective sheet.

At this time, a total visible light transmittance of the optical coherent layer was 87%, a hue of the optical coherent pigment changed from gold to silver (achromatic color) in diffused light.

The hue variable retroreflective sheet manufactured in the present example changed from red gold to green gold in diffused light depending on a point of view, and a hue that could provide excellent designability could be observed visually. Moreover, when the hue variable retroreflective sheet was irradiated with light at night, the retroreflected light glittered in pure blue, and a sharp interference color could be observed visually in red purple to gold in a wider observation angle region due to the interference effect of the light that was mirror-reflected by the surface of the outermost layer of the optical coherent pigment and the core material. The hue variable retroreflective sheet provides an excellent decorative effect that could not be achieved by a conventional marking film and a conventional retroreflective sheet, and furthermore, an article using the hue variable retroreflective sheet attached thereto had remarkable designability and a high eye-catching effect.

Moreover, when the thus completed retroreflective sheet was observed from its surface side, the counterfeit preventing logo mark could be observed visually in a metallic tone. Furthermore, when the retroreflective sheet was irradiated with light at night, the retroreflective sheet except for the logo mark part glitters brightly due to the retroreflective effect, on the contrary, the logo mark part was dark, whereby the counterfeit preventing logo mark could be observed visually sharply due to the thus obtained contrast. As mentioned above, the retroreflective sheet not only had excellent designability, but also achieved a remarkable effect as a counterfeit preventing film.

Example 3

Figure 2:
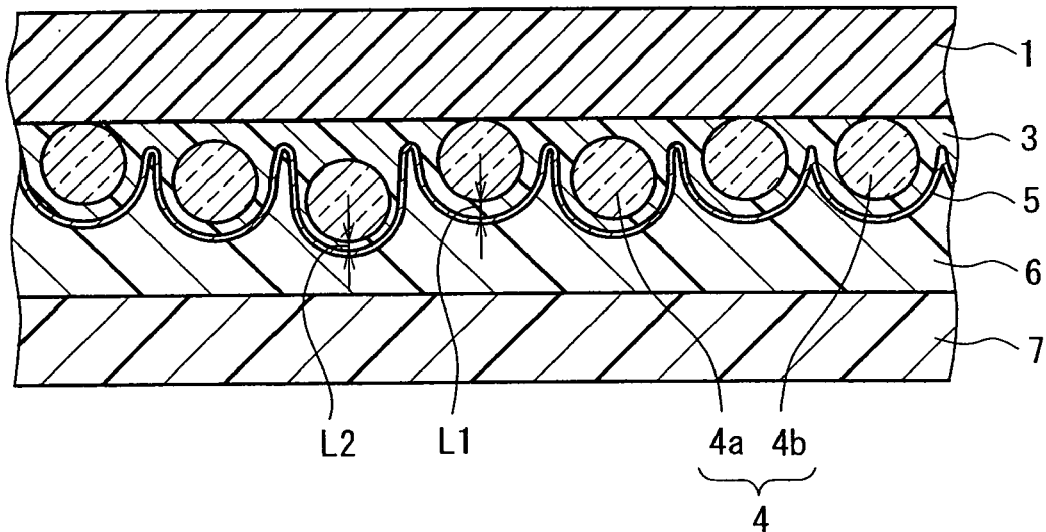
FIG. 2 is a cross-sectional view showing a hue variable retroreflective sheet that is applied to a wide-angle retroreflective sheet of Example 3 of the present invention.

FIG. 2 is a cross-sectional view showing the hue variable retroreflective sheet of the present example, where the reference numeral 1 represents a surface layer, 3 represents a focusing layer, 4, 4a and 4b represent glass spheres, more specifically, 4a represents a glass sphere in a glass sphere group A that is not in contact with the surface layer and 4b represents a glass sphere in a glass sphere group B that is in contact with the surface layer, 5 represents a metal reflective layer, 6 represents a pressure-sensitive adhesive layer, and 7 represents a release material. In addition, L1 and L2 represent dry film thicknesses of the focusing layer from the tops of the glass spheres, which have a relationship of L1>L2.

A surface layer was manufactured similarly to Example 1, except for changing the surface layer 1-1 as follows. A resin composition for the surface layer, as a replace of the surface layer 1-1, contained: about 100 parts of Fluonate K-703 fluorocarbon resin, produced by Dainippon Ink & Chemicals, weight average molecular weight: about 40,000, hydroxyl value of solids: 72, nonvolatile content: about 60%); about 25 parts of Burnock DN-950 (hardener); about 1 part of TINUVIN 900 (ultraviolet absorber); and about 1 part of TINUVIN 292 (antioxidant).

Next, a glass sphere-dispersed resin solution that will be described below was applied as a focusing layer on the surface layer 1-3 (colored layer).

(1) 75.0 parts of polyvinyl butyral resin solution (degree of polymerization: 680, polyvinyl alcohol unit content: 23 wt %, glass transition point: 66° C., solid content: 21%, n-butanol/toluene ratio: 1:1)

(2) 3.3 parts of Super Beckamine J-820-60 (produced by Dainippon Ink & Chemicals, butylated melamine resin, solid content: 60%) (3) 0.2 parts of Beckamine P-198 (produced by Dainippon Ink & Chemicals, curing accelerator, acid value: 400) (4) 0.5 part of BYK-053 (produced by BYK Chemie Japan, alkyl vinyl ether copolymer, anti-foaming agent) (5) 7.0 parts of POLYCIZER W-360-ELS (produced by Dainippon Ink & Chemicals, macromolecular plasticizer) (6) 7.6 parts of toluene (7) 7.6 parts of n-butanol (8) 68.0 parts of glass spheres (median diameter: 50 μm, containing at least 90% within ±10 μm, refractive index: 2.25 ±0.05)

A viscosity of the above-mentioned blended resin (excluding the glass spheres) paint during its application was 1900 mPa.s.

The above-described glass sphere-dispersed resin solution was applied onto the surface layer 1-3, adjusting a WET film thickness so that the focusing layer would be formed at a focus position (a dry film thickness from the top of the glass sphere ranges from about 13 μm to 14 μm) of the glass spheres that were in contact with the surface layer 1-3.

Thereafter, the solution was dried at room temperature for about 5 minutes, then was dried at 100° C. for 5 minutes in the subsequent step, and then was heated to be dried at 140° C. for 10 minutes so as to cure the focusing layer resin.

Next, aluminum was applied as a metal reflective layer by vacuum vapor deposition onto the focusing layer so as to provide a film thickness of 80 nm.

A solution containing a mixture of: 100 weight parts of an acrylic pressure-sensitive adhesive Finetack SPS-1016 (produced by Dainippon Ink & Chemicals); and 1 weight part of a crosslinking agent DN-750-45 (produced by Dainippon Ink & Chemicals) was applied onto a silicone-coated surface of a release paper that was prepared separately by silicone coating, which was dried at 100° C. for 5 minutes, thereby manufacturing a pressure-sensitive adhesive layer with a thickness of 50 μm.

Subsequently, a surface of the pressure-sensitive adhesive layer was attached onto a surface of the metal reflective layer, and then the polyester film that is the supported film was released so as to manufacture a final product. Herein, the glass spheres that were in contact with the surface layer 1-3 were about 67% of that of the total glass spheres.

Furthermore, before forming the metal reflective layer, when the intermediate product was immersed in toluene for 1 minute, was immersed in xylene for 1 minute, and was immersed in methanol for 10 minutes, respectively, the focusing layer was not dissolved therein.

The hue variable retroreflective sheet manufactured in the present example changed from gold to blue purple in diffused light depending on a point of view, and a hue that could provide excellent design ability could be observed. Moreover, when the hue variable retroreflective sheet was irradiated with light at night, the retroreflected light glittered in pure blue, and could be observed visually because of the high wide-angle reflectivity even when largely averting the sight from the light source. When changing the position of the light source or the point of view, a hue change could be observed visually continuously from the retroreflected light in pure blue to the mirror-reflected light in gold. The hue variable retroreflective sheet provided a decorative effect that could not be achieved by a conventional marking film and a conventional retroreflective sheet, and furthermore, an article using the hue variable retroreflective sheet attached thereto had remarkable designability and a high eye-catching effect.

Example 4

A hue variable retroreflective sheet was manufactured similarly to Example 1, except for changing the resin composition for the glass sphere fixing layer as follows.

The resin composition is prepared by using: 100 parts of Bekkolite M-6401-50; 10 parts of Super Beckamine J-820-60; 0.5 parts of Beckamine P-198; 10.0 parts of POLYCIZER W-360-ELS; 10.0 parts of DICTON BLUE HD-6272; and 0.7 parts of DICTON RED HD-6112A.

The hue variable retroreflective sheet manufactured in the present example changed from gold to blue purple in diffused light depending on a point of view. Light that was transmitted by the optical interference layer was absorbed by a pigment due to an effect of the pigment that was added to be dispersed in the glass sphere fixing layer, and a background of the optical coherent layer was darkened, so that a hue of the optical interference color that could provide excellent designability could be observed visually exceedingly clearly. Moreover, when the hue variable retroreflective sheet was irradiated with light at night, the retroreflected light glittered in pure blue, a sharp interference color could be observed in red purple to gold in a wider observation angle region due to the interference effect of the mirror-reflected light by the optical coherent pigment. The hue variable retroreflective sheet provides a decorative effect that could not be achieved by a conventional marking film and a conventional retroreflective sheet, and furthermore, an article using the hue variable retroreflective sheet attached thereto had remarkable designability and a high eye-catching effect.

Moreover, when the above-described final product was attached onto an aluminum substrate with a thickness of 1 mm that is set forth in the JISZ9117 7. testing method, and was pushed out by a depth of 8 mm with a spherical surface punch having a radius of 10 mm by using an Erichsen film strength tester that is set forth in JISB7729, the retroreflective sheet was not risen from the aluminum substrate, and did not cause imperfection such as a crack and a breakage.

Example 5

A hue variable retroreflective sheet was manufactured similarly to Example 1, except for changing the resin composition for the surface layer 1-2 (optical coherent layer) as follows.

An example of the resin composition contained: about 100 parts of Burnock D6-439; about 82 parts of Burnock DN-980 (polyisocyanate prepolymer produced by Dainippon Ink & Chemicals, nonvolatile content: about 75%) as a hardener; and 3.5 parts of Variocrm Magic Gold L 1400 (produced by BASF Inc., an optical coherent pigment); and 7.0 parts of DICTON BLUE HD-6272 (produced by Dainippon Ink & Chemicals, processed pigment for oil-based paint, pigment concentration: 10%).

The hue variable retroreflective sheet manufactured in the present example changed from yellow green to blue green in diffused light depending on a point of view, and a hue that could provide excellent designability could be observed visually. Moreover, when the hue variable retroreflective sheet was irradiated with light at night, the retroreflected light glittered in pure blue, and a sharp interference color could be observed visually in red purple to gold in a wider observation angle region due to the interference effect of the mirror-reflected light by the optical coherent pigment. The hue variable retroreflective sheet provides an excellent decorative effect that could not be achieved by a conventional marking film and a conventional retroreflective sheet, and furthermore, an article using the hue variable retroreflective sheet attached thereto had remarkable designability and a high eye-catching effect.

Comparative Example 1

A below-described resin composition was applied onto a polyester film whose both surfaces were not treated to have easy adhesion so as to provide a dry film thickness of about 40 μm, which was heated to be dried at about 140° C. for about 10 minutes, thereby obtaining a surface layer. An example of the resin composition contained: 100 parts of Bekkolite M-6401-50 (produced by Dainippon Ink & Chemicals, solid content: 60%); 20 parts of Super Beckamine J-820-60 (produced by Dainippon Ink & Chemicals, butylated melamine resin, solid content: 60%); 1 part of Beckamine P-198; 9.0 parts of DICTON BLUE HD-6272; and 0.2 parts of DICTON RED HD-6112A.

Next, a resin composition for a glass sphere fixing layer was prepared by using: 100 parts of Bekkolite M-6401-50; 10 parts of Super Beckamine J-820-60; 0.5 parts of Beckamine P-198; 10.0 parts of POLYCIZER W-360-ELS; 10.0 parts of DICTON BLUE HD-6272; and 0.7 parts of DICTON RED HD-6112A.

This composition was applied onto the above-described surface layer so as to provide a dry film thickness that is about 70% of a sphere diameter of glass spheres, the resin composition was dried at room temperature so as to volatilize its solvent, the glass spheres were embedded therein, and the resin composition was dried further at 140° C. for 5 minutes.

Herein, as the glass spheres, high-refractive-index glass spheres containing titanium oxide as a main component, which had a refractive index of 2.23 and a particle diameter ranging from 55 μm to 65 μm, were used.

A resin composition for a focusing layer was prepared by using: 100 parts of a polyurethane resin Burnock L8-974; and 10 parts of Super Beckamine J-820-60. This composition was applied onto the above-described glass sphere so as to provide a dry film thickness of about 14 μm, which was dried at 100° C. for 10 minutes, and then further was heated to be dried at 140° C. for 10 minutes.

Aluminum was used as a metal reflective layer, and was applied on the focusing layer by vacuum vapor deposition so as to provide a film thickness of 80 μm, thereby manufacturing the retroreflective sheet.

A surface of the thus obtained metal reflective layer of the reflective sheet and a pressure-sensitive adhesive layer with a thickness of about 35 μm, which was manufactured by applying on a release paper that was coated with silicone and drying a solution containing a mixture of 100 weight parts of an acrylic pressure-sensitive adhesive Finetack SPS-1016 (produced by Dainippon Ink & Chemicals); and 1 part of a crosslinking agent DN-750-45 (produced by Dainippon Ink & Chemicals), were attached to each other, and thereafter, the polyester film as a supported film was released, which came to a final product.

From the retroreflective sheet manufactured in the present comparative example, only a blue hue could be observed visually in diffused light even when changing a point of view, and other hue than blue was not observed visually. Moreover, when the retroreflective sheet is irradiated with light at night, the retroreflected light glittered in blue, and the mirror-reflected light was also observed in blue similarly, but a hue thereof was dark, and did not glitter. The retroreflected light in the diffused light and the projection of light also was observed in blue, and achieved only a low decorative effect.

Comparative Example 2

A below-described resin composition was applied onto a polyester film whose both surfaces were not treated to have easy adhesion so as to provide a dry film thickness of about 40 μm, which was heated to be dried at about 140° C. for about 10 minutes, thereby obtaining an optical coherent film.

An example of the resin composition contained: about 100 parts of Bumock D6-439 (alkyd resin produced by Dainippon Ink & Chemicals, hydroxyl value of solids: 140, nonvolatile content: 80%); about 82 parts of Bumock DN-980 (polyisocyanate prepolymer produced by Dainippon Ink & Chemicals, nonvolatile content: 75%) as a hardener; and 3.5 parts of Variocrm Magic Gold L 1400 (produced by BASF Inc., optical coherent pigment).

The thus obtained optical coherent film and a pressure-sensitive adhesive layer with a thickness of about 35 μm, which was manufactured by applying on a release paper that was coated with silicone and drying a solution containing a mixture of 100 weight parts of an acrylic pressure-sensitive adhesive Finetack SPS-1016 (produced by Dainippon Ink & Chemicals); and 1 part of a crosslinking agent DN-750-45 (produced by Dainippon Ink & Chemicals), were attached to each other, and thereafter, the polyester film as a supported film was released, which came to a final product.

Thereafter, the release paper was released and the final product was attached onto an aluminum plate that was coated in black.

The optical coherent sheet manufactured in the present comparative example changed from gold to gray in the diffused light depending on the point of view, but when being irradiated with light at night, only the mirror-reflected light of the optical coherent sheet was observed in gold, and only the black coating at the base was observed through the optical coherent sheet, which provided a remarkably low decorative effect. Industrial Applicability The present invention relates to a hue variable retroreflective sheet, which can be applied to various purposes, such as vehicle license plates, security sheets, advertising signs, signal boards, wrapping sheets for vehicles, toys, decorated cases, mobile phones and the like.

The invention claimed is:

1. A hue variable retroreflective sheet comprising: a surface layer composed of at least one layer; and a plurality of retroreflective elements that are positioned beneath the surface layer, wherein the retroreflective element retroreflects incident light toward a light source direction, at least one layer of the surface layer is an optical coherent layer that changes in color depending on a point of view and in which an optical coherent coloring material with a core material having a surface that is covered with one or more substantially transparent coating layer is added to be dispersed, and mirror-reflects the incident light toward a direction opposite to the light source side, at least one layer of the retroreflective sheet is a colored layer containing a coloring material that colors retroreflected light, a total visible light transmittance of the optical coherent layer is higher than a total visible light transmittance of the colored layer, and the retroreflected light and the mirror-reflected light provide different hues.

2. The hue variable retroreflective sheet according to claim 1 that can be observed visually in diffused light, and provides hues in two or more different colors depending on a point of view.

3. The hue variable retroreflective sheet according to claim 1, wherein the optical coherent layer can be observed visually in the diffused light and provides hues in two or more different colors depending on a point of view, and the colored layer is positioned beneath the optical coherent layer.

4. The hue variable retroreflective sheet according to claim 1, wherein the total visible light transmittance of the optical coherent layer is 30% or more.

5. The hue variable retroreflective sheet according to claim 1, wherein the optical coherent coloring material is an optical coherent pigment comprising: a core material having a function that does not substantially transmit light and reflects the light; and a coating layer having a mirror-reflecting function on an interface between any of the layers.

6. The hue variable retroreflective sheet according to claim 5, wherein a coloring material is further contained, besides the optical coherent coloring material, in the optical coherent layer, and, where a content of the coloring material is a and a content of the optical coherent coloring material is β, α/β is 0.45 or less.

7. The hue variable retroreflective sheet according to claim 1, wherein at least one color of hues that can be observed visually in the diffused light and the hue of the retroreflected light is an achromatic color.

8. The hue variable retroreflective sheet according to claim 1, wherein at least one color of the hues that can be observed visually in the diffused light is substantially opposite hue to the hue of the retroreflected light.

9. The hue variable retroreflective sheet according to claim 1 that is an enclosed lens type retroreflective sheet, wherein
the retroreflective elements are glass spheres having a refractive index of 2.10 or more,
the glass spheres are enclosed in a resin,
a focusing layer is formed on a rear surface of the glass sphere, and
a metal reflective layer is formed on a rear surface of the focusing layer.

10. The hue variable retroreflective sheet according to claim 1, wherein
the retroreflective elements are glass spheres having a refractive index of 2.10 or more,
a focusing layer enclosing the glass spheres is formed,
a metal reflective layer is formed on a rear surface side of the focusing layer, and
the glass spheres are disposed at random positions in a thickness direction of the focusing layer.

11. The hue variable retroreflective sheet according to claim 10, wherein
the glass spheres comprise: a glass sphere group B that is in contact with the surface layer; and a glass sphere group A that is positioned away from the surface layer, and
the glass sphere group A achieves a reflective performance in an observation angle that is larger than an observation angle of the glass sphere group B.

12. The hue variable retroreflective sheet according to claim 10, wherein
the glass spheres comprise: a glass sphere group B that is in contact with the surface layer; and a glass sphere group A that is positioned away from the surface layer,
a metal reflective layer of the glass sphere group B is formed at a focus formation position,
a thickness of a focusing layer of the glass sphere group A is smaller than a thickness of a focusing layer of the glass sphere group B, and
the glass sphere group A achieves a retroreflective performance in an observation angle that is relatively larger than an observation angle of the glass sphere group B.

13. The hue variable retroreflective sheet, according to claim 10, wherein
the glass spheres comprise: a glass sphere group B that is in contact with the surface layer; and a glass sphere group A that is positioned away from the surface layer,
a focusing layer of the glass sphere group B that is formed on the glass sphere concentrically has a film thickness that achieves a maximum reflective performance at an observation angle of 0.2° and an incident angle of 50°,
a film thickness of a focusing layer of the glass sphere group A is smaller than the film thickness of the focusing layer of the glass sphere group B, and
the glass sphere group A achieves a retroreflective performance in an observation angle that is larger than an observation angle of the glass sphere group B.

14. The hue variable retroreflective sheet according to claim 1 that is an encapsulated lens type retroreflective sheet, wherein
the retroreflective elements are glass spheres having a refractive index ranging between 1.80 and 2.00 inclusive,
a substantial lower hemisphere of the glass sphere that is covered with a metal reflective layer is held by the resin support sheet so as to be embedded in the resin support sheet, and
air is enclosed on a surface side of the glass spheres.

15. The hue variable retroreflective sheet according to claim 1, wherein the retroreflective elements are a cube corner type.

16. The hue variable retroreflective sheet according to claim 1 that is flexible and stretchable, and can be attached onto a three-dimensionally curved surface.

17. The hue variable retroreflective sheet according to claim 16 that is not risen from an aluminum substrate, and does not cause imperfection such as a crack and a breakage, when being attached to the aluminum substrate with a thickness of 1 mm that is set forth in a JISZ9117 7. testing method and being extruded in a depth of 5 mm with a spherical surface punch having a radius of 10 mm by using an Erichsen film strength tester that is set forth in JISB7729.

18. The hue variable retroreflective sheet according to claim 1, wherein
the retroreflective elements are glass spheres having a refractive index of 2.10 or more and comprise: a glass sphere fixing layer; glass spheres and printing resin layer; a focusing layer; and a metal reflective layer in this order,
the printing resin layer forms a mark,
the glass spheres are disposed in the glass sphere fixing layer,
the glass spheres and the printing resin layer are disposed so as not to be positioned overlapping with each other when being observed from the surface layer in a thickness direction of the retroreflective sheet, and
the retroreflected light and the mirror-reflected light provide different hues.

* * * * *

UNITED STATES PATENT AND TRADEMARK OFFICE
CERTIFICATE OF CORRECTION

PATENT NO.        : 7,303,292 B2                                       Page 1 of 1
APPLICATION NO. : 10/594302
DATED             : December 4, 2007
INVENTOR(S)       : Yukawa et al.

It is certified that error appears in the above-identified patent and that said Letters Patent is hereby corrected as shown below:

Column 5, line 61: "material is a and" should read --material is α and--.
Column 20, line 18-19: "Fluonate K-703 fluorocarbon" should read --Fluonate K-703 (fluorocarbon--.
Column 23, line 43: "Bumock D6-439" should read --Burnock D6-439--.
Column 23, line 45: "Bumock" should read --Burnock--.
Column 24, line 57 (claim 6): "material is a and" should read --material is α and--.
Column 25, line 14 (claim 10): "2.10or more" should read --2.10 or more--.
Column 25, line 51 (claim 13): "50°" should read --5°--.

Signed and Sealed this

Eleventh Day of November, 2008

JON W. DUDAS
*Director of the United States Patent and Trademark Office*